INVENTORS
H. A. FINK Jr.
P. B. ANDERSEN

July 30, 1968  H. A. FINK, JR., ET AL  3,394,786
SLIP CLUTCH
Filed July 18, 1966  2 Sheets-Sheet 2

INVENTORS
H. A. FINK Jr.
P. B. ANDERSEN

United States Patent Office 3,394,786
Patented July 30, 1968

3,394,786
SLIP CLUTCH
Harry A. Fink, Jr., East Moline, and Peter Bonde Andersen, Rock Island, Ill., assignors to Deere & Company, Moline, Ill., a corporation of Delaware
Filed July 18, 1966, Ser. No. 565,771
10 Claims. (Cl. 192—56)

ABSTRACT OF THE DISCLOSURE

A friction-type slip clutch having annular disk-type clutch plates alternately connected to the input and output members. The clutch engaging pressure is transmitted from the clutch spring to the plates through a linkage having a cam means which shifts the linkage after a predetermined amount of slippage between the input and output members to remove the clutch engaging spring force. The cam means is disconnected from the output member upon disengagement of the clutch but is reconnected upon manual re-engagement of the clutch in any relative angular position between the clutch members.

---

This invention relates to a torque-limiting clutch and more particularly to a friction-type slip clutch having an improved means for automatically disengaging the clutch after a predetermined amount of slippage.

Friction-type slip clutches have long been utilized in various machinery drives, particularly in agricultural machines, to limit the torque transmitted and thereby protect the working and drive components. However, when such a clutch slips, heat is generated, which creates a problem if the slippage time is protracted. Moreover, the heat and wear on the friction materials changes the clutch characteristics, so that the torque at which slippage occurs has been widely variable after such a clutch has been subject to slippage.

While it is known to provide such a clutch with means for automatically disengaging the clutch after a predetermined amount of slippage, previous clutches of this type have presented a problem in that it has been necessary that the drive portion of the clutch be in a certain position relative to the driven portion to permit clutch reengagement. If the output end of the clutch were completely stopped, this would entail stopping the clutch input in a proper position relative to the output so that the clutch could be reengaged.

The primary object of the present invention is to provide such a clutch having improved means for automatically disengaging the clutch after a fraction of a revolution of slippage, and further to provide such a clutch which is reengageable in any relative position of the drive and driven clutch members. Another object is to provide such a clutch which can be easily reengaged without stopping the clutch input and still further to provide improved cam means for effecting the clutch disengagement.

These and other objects will become apparent from the following detailed description and accompanying drawings wherein the preferred embodiment of the invention is disclosed.

Figure 1:
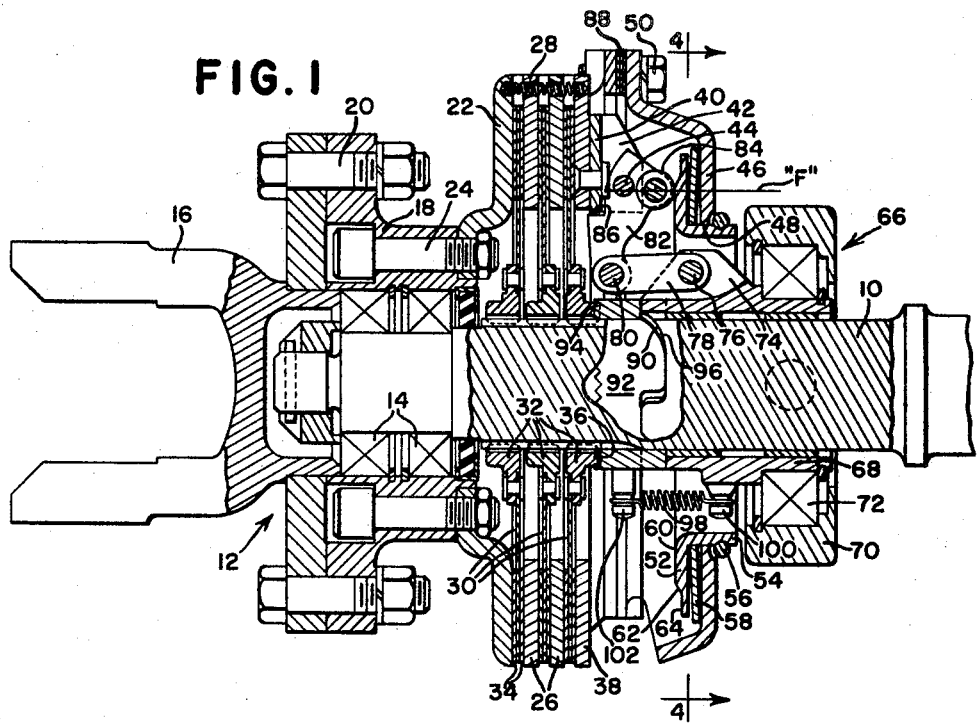
FIG. 1 is a longitudinal axial section of the clutch, showing the clutch in an engaged condition, with portions of the clutch being broken away to show the cam means.
Figure 2:
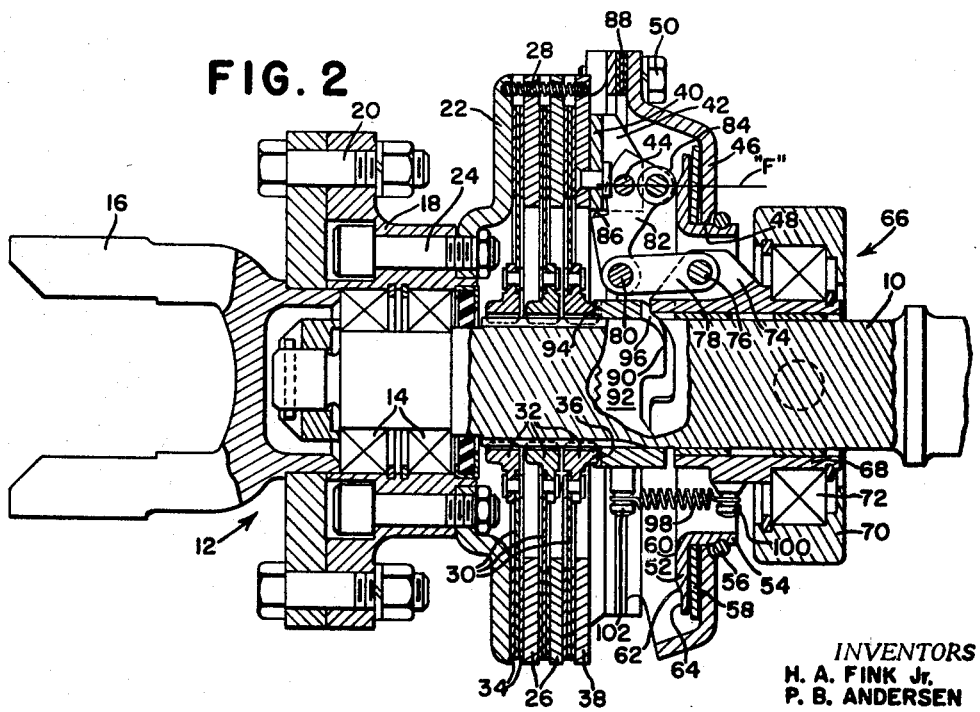
FIG. 2 is a view similar to FIG. 1, showing the clutch after a small degree of slippage with automatic clutch disengagement impending.
Figure 3:
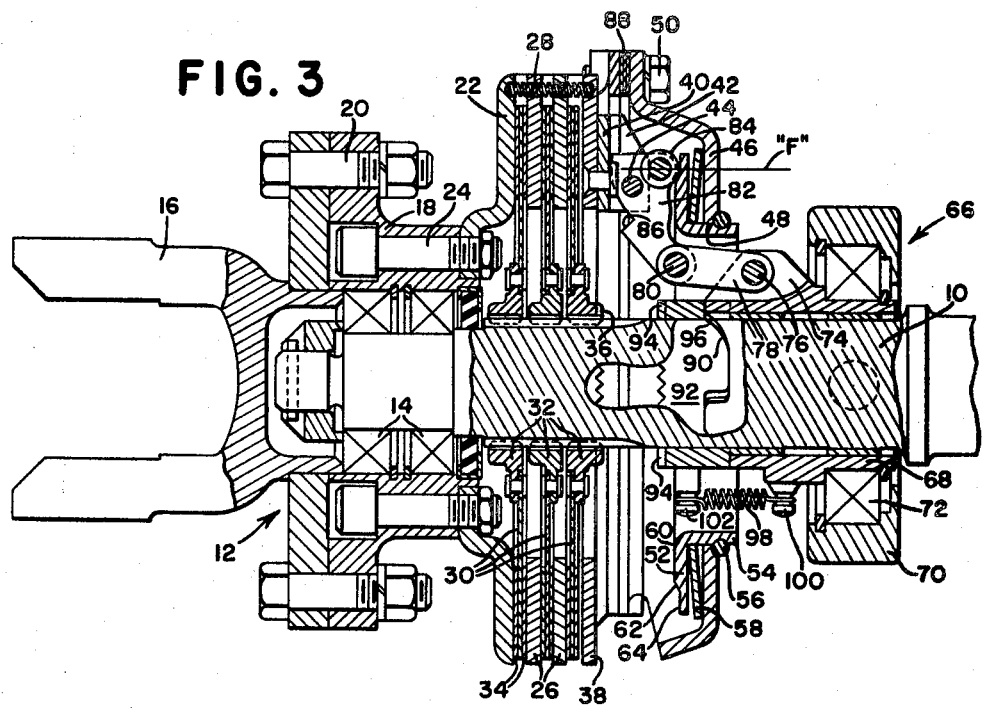
FIG. 3 is a view similar to FIGS. 1 and 2, showing the clutch in a disengaged position.
Figure 4:
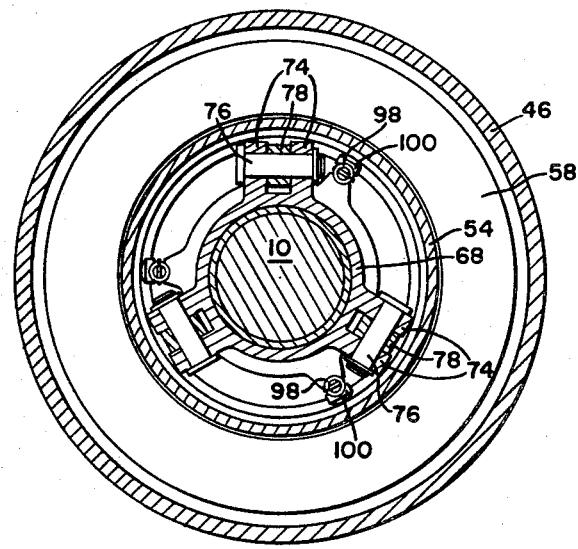
FIG. 4 is a transverse section taken along the line 4—4 of FIG. 1.

The numeral 10 denotes an input or driving clutch member which is rotated in a counterclockwise direction when viewed from the input end of the clutch (from the right in FIGS. 1–3). An output or driven clutch member 12 is coaxially journaled on the input clutch member 10 by means of a pair of bearings 14 at the output end of the input clutch member. While the clutch members 10 and 12 are respectively described as the input and output members for convenience in describing the invention, it is to be understood that the reverse arrangement could also be utilized within the scope of the invention.

The output member 12 includes a yoke 16 at its output end, attached to a central hub portion 18 by a plurality of fasteners 20, and an annular cup-shaped portion 22, attached to the hub portion 18 by a plurality of fasteners 24 and having its larger, open end facing the input end of the clutch. The annular portion 22 carries a plurality of annular driven clutch plates 26 coaxial with the clutch members 10 and 12 and biased apart by a relatively light clutch spring 28. A plurality of annular drive clutch plates 30 having hub portions 32 coaxially splined to the input member 10 are mounted between the clutch plates 26 in an alternating arrangement, each drive clutch plate 30 having a friction facing 34 on each side engageable with the adjacent driven clutch plates 26. The clutch plate hub 32 nearest the input end of the clutch forms a ring of face teeth 36 facing the input end of the clutch. The clutch plate nearest the input end of the clutch forms a thrust ring 38, which carries a plurality of thrust members 40 on its radial face nearest the input end of the clutch. The thrust members 40 are equally spaced around the thrust ring 38, and, in the preferred embodiment illustrated, three thrust members are provided, although only one is apparent from the drawings. Each thrust member 40 includes a pair of transversely apertured ears 42 extending toward the input end of the clutch and carrying a transverse pivot 44.

A second annular cup-shaped member 46, having an axial bore 48, is coaxially attached to the cup-shaped portion 22 of the output member 12 by a plurality of fasteners 50, the cup-shaped members 22 and 46 forming a substantially closed clutch housing attached to and rotating with the output member 12. An annular disk-like member 52 is coaxially mounted within the cup-shaped portion 46 and has an annular hub 54 extending through the bore 48. A retaining ring 56 is coaxially mounted on the hub 54 and engages the input end of the member 46 to limit the axial sliding movement of the disk-like member 52 toward the output end of the clutch. The member 52 is biased toward the output end of the clutch by an annular Belleville-type spring 58 coaxially mounted on the hub 54 between the members 52 and 46. The member 52 has a relatively flat radial surface 60 facing the output end of the clutch, and an annular taper or cam surface 62 radially outwardly from the surface 60, the taper terminating in a second relatively flat radial surface 64 adjacent the periphery of the member 52, the axial thickness of the member 52 being substantially greater at the surface 60 than at the surface 64.

The clutch is engaged by axial pressure on the thrust ring 38, which compresses the plates 26 and 30 into engagement, the pressure being supplied to the thrust ring 38 by a clutch-actuating mechanism indicated generally by the numeral 66. The actuating mechanism includes an annular, sleeve-like actuating member 68 coaxially rotatable on and axially slidable on the input clutch member 10. The actuating member journals an annular shifter member 70 via a bearing 72 and also includes three pairs of equally spaced radially extending ears 74, each pair of ears carrying a transverse pivot 76. A link 78 is pivotally mounted on each pivot 76 for movement in a longitudinal arc and each link 78 carries a second transverse pivot 80 at its opposite end, parallel to the pivot 76. A bell crank 82 is pivotally mounted on each transverse pivot 44, one end of each bell crank being connected to a pivot 80 and the other end extending in a generally axial direction toward the input end of the clutch and carrying a transverse roller or cam follower 84 which engages the surfaces 60, 62, and 64 of the member 52. The rocking movement of each bell crank 82 about its pivot 44 is limited in one direction by a stop 86 on the bell crank engaging a thrust member 40. When the rollers 84 engage the surface 60, the Belleville spring 58 is substantially deflected, the force exerted thereby being transmitted to the thrust ring 38 via the thrust members 40, the pivots 44, the bell cranks 82, the rollers 84, and the member 52. A plurality of shims 88 are provided between the members 22 and 46 to vary the compression of the spring 58 when the clutch is engaged, thereby providing a means of varying the torque at which the slippage occurs, although the variation obtainable by means of the shims 88 is somewhat limited since the Belleville spring 58 exerts an approximately uniform force in its working range.

The output end of the annular actuating member 68 defines an annular cam surface 90, which, in the preferred embodiment illustrated, is divided into three identical 120° segments, only one entire segment being shown in FIGS. 1–3 by partially breaking away the input member 10. An annular, sleeve-like coupling member 92 is coaxially rotatable and slidable on the clutch member 10 between the actuating member 68 and the clutch plate hubs 32 and includes a ring of face teeth 94 opposite and engagebale with the face teeth 36. The coupling member 92 also defines an annular cam surface 96 opposite to and matable with the cam surface 90, the cam surfaces being biased toward a mating condition by a plurality of axially extending springs 98, connected to the actuating member 68 and to the coupling member 92 by radially extending posts 100 and 102 respectively.

To engage the clutch, the annular actuating member 68 is shifted axially on the clutch member 10 toward the output end of the clutch via the shifter member 70, which in turn is shifted manually or by means of any conventional shifting device. The axial movement of the member 68 rotates the bell cranks 82 in a clockwise direction about their pivots 44 until the stops 86 engage the thrust members 40. At this point the clutch is engaged, as shown in FIG. 1, the spring 58 being deflected and transmitting a predetermined thrust force on the stacked clutch plates 26 and 30 as previously described. Since the line of force transmitted through a cam surface by a roller type cam follower is transmitted in a line normal to the surface and through the axis of the roller, when the clutch is in the engaged position, as shown in FIG. 1, the lines of force, indicated by the letter F, are directed interiorly of the axis of the pivots 44, so that the spring force tends to rotate the bell cranks 82 in a clockwise direction, maintaining the stops 86 against the thrust members 40. In the engaged position, the cam surfaces 90 and 96 are totally engaged and the coupling member 92 is connected to the adjacent clutch plate hub 32 via the meshing teeth 94 and 36. In normal operation, the clutch members 10 and 12 are rotated in unison through the driving connection effected by the engaged clutch plates 26 and 30.

If the torque required to rotate the output member 12 exceeds the torque transmittable through the engaged clutch plates, the clutch plates 30 will slip in a counterclockwise direction relative to the clutch plates 26, as viewed from the input end of the clutch. As a result, the coupling member 92, which is attached to the input clutch member 10 via the adjacent clutch plate hub 32, will rotate in a counterclockwise direction relative to the annular actuating member 68 which is attached to the output clutch member 12 via the thrust ring 38, the thrust member 40, and the clutch actuating mechanism 66. Relative rotation of the coupling member 92 relative to the member 68 causes the member 68 to shift axially toward the input end of the clutch by means of the camming action of the cam surfaces 90 and 96. The shifting of the member 68 rotates the bell cranks 82 in a counterclockwise direction about their pivots 44, so that, after a small degree of relative rotation, a position is reached wherein the lines of force F extend through the axis of the pivots 44, as shown in FIG. 2. At this point, any additional clutch slippage and consequent shifting of the member 68 toward the input end of the clutch will cause the lines of force F to extend exteriorly of the axis of the pivots 44, so that the force exerted by the spring 58 now tends to rotate the bell cranks 82 in a counterclockwise direction about their pivots 44, the additional counterclockwise movement of the bell cranks causing the rollers 84 to engage the tapered cam surface 62, which shifts the line of force substantially exteriorly of the pivots 44 to create a substantial counterclockwise torque on the bell cranks 82. Thus, the bell cranks 82 will continue to rotate in a counterclockwise direction until the retaining ring 56 engages the member 46, limiting further extension of the spring 58, as shown in FIG. 3. In this position the rollers 84 rest on the cam surface 64 and the annular actuating member 68 is shifted into its extreme position toward the input end of the clutch. Since there is no longer an axial force exerted by the spring 58 on the thrust members 40; the clutch springs 28 separate the clutch plates, permitting free relative rotation between the clutch plates 26 and 30. Thus, only a small degree of relative rotation between the members 92 and 68, caused by clutch slippage, is necessary to completely disengage the clutch, since, after the clutch has slipped the distance shown in FIG. 2, the mechanism 66 completes the disengagement. When the clutch is disengaged, and the actuating member 68 shifts to its disengaged position, the springs 98 stretch and exert a force which pulls the coupling member 92 out of engagement with the face teeth 36 and returns it to its original position wherein the cam surfaces 90 and 96 completely mesh.

To reengage the clutch, the actuating member 68 is again shifted axially toward its engaged position, whereupon the rollers 84 will roll inwardly along the taper 62 and onto the surface 60, again deflecting the spring 58 and transmitting a clutch-engaging pressure to the clutch plates. This movement will also press the face teeth 94 into engagement with the teeth 36, and since the face teeth 36 and 94 are engageable in any relative position of the member 92 and the adjacent hub 32, it is not necessary to time the input end of the clutch with the output end of the clutch. A small amount of backlash is provided between the mating cam surfaces 90 and 96 to permit a small degree of relative rotation to ensure total engagement of the face teeth 36 and 94.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. A torque-limiting friction clutch comprising: first and second coaxially journaled clutch members; a plurality of adjacent friction clutch elements alternately connected to and rotatable with the first and second clutch members respectively; a clutch-engaging means carried by the second clutch member and shiftable between a first position wherein it provides a predetermined amount of clutch-engaging force on the clutch elements to effect a torque-limited driving connection and a second position wherein it removes said clutch-engaging force; a coupling member coaxially journaled relative to the first clutch member and axially shiftable thereon between a first position wherein it is connected to said first clutch member for rotation therewith and a second position wherein it is rotatable relative to said first clutch member; and cam means operative between the clutch-engaging means and the coupling member when the coupling member is in its first position to shift the clutch-engaging means into its second position in response to a predetermined amount of relative rotation between the clutch members.

2. The invention defined in claim 1 wherein the clutch-engaging means includes a spring means mounted on the second clutch member and a connecting mechanism acting between the spring means and the clutch elements and shiftable between a first position wherein it deflects the spring means, the resulting spring force biasing the clutch elements into said driving engagement, and a second position wherein it disconnects the clutch elements from the spring means, and further characterized in that the cam means acts between the connecting mechanism and the coupling member to shift the connecting mechanism into its second position.

3. The invention defined in claim 2 wherein the coupling member is shiftable into its first position in any relative angular position between the coupling member and the first clutch member.

4. The invention defined in claim 3 and including means operably interconnecting the coupling member and the connecting mechanism for moving the coupling member into its second position when the connecting means is shifted to its second position.

5. The invention defined in claim 4 wherein the first clutch member coaxially carries a ring of axially directed face teeth rotatable with the first clutch member and the coupling member is annular in shape and also includes a ring of axially directed face teeth opposite the first clutch member face teeth and meshing with said face teeth in the first coupling member position.

6. The invention defined in claim 5 wherein the connecting mechanism includes an annular member coaxially journaled relative to the first clutch member, and the cam means includes a first cam element carried by said annular member and a second cam element carried by the coupling member and engaging the first cam element to axially shift the connecting mechanism annular member relative to the coupling member in response to relative rotation between the cam elements to effect the shifting of the connecting mechanism.

7. In a torque-limiting clutch of the type having first and second coaxially journaled clutch members and a plurality of adjacent friction clutch elements alternately connected to and rotatable with the first and second clutch members, and a clutch-engaging means carried by the second clutch member and shiftable between a first position wherein it provides a predetermined amount of force compressing said clutch elements into engagement to effect a torque-limited driving connection between the clutch members and a second position wherein it removes said engaging force, the clutch-engaging means including an annular actuating member coaxially journaled relative to the first clutch member and axially shiftable thereon between first and second positions wherein it respectively establishes the first and second positions of the clutch-engaging means, the combination therewith of means for automatically shifting the clutch-engaging means to its disengaged position after a certain amount of clutch slippage comprising: an annular coupling member operably connectible to the first clutch member for rotation therewith and cam means acting between the coupling member when it is connected to the first clutch member and the actuating member to positively shift the actuating member into its second position in response to a fraction of a revolution of relative rotation between the actuating member and the coupling member.

8. The invention defined in claim 7 wherein the coupling member is axially shiftable on the first clutch member between a first position wherein it is connected to said first clutch member for rotation therewith in any relative angular position between the clutch member and the coupling member and a second position wherein it is disconnected from said first clutch member, and also including spring means acting between the coupling member and the actuating member for biasing the coupling member into its second position when the actuating member is shifted to its second position.

9. The invention defined in claim 8 wherein the first clutch member coaxially carries a ring of axially directed face teeth and the coupling member is annular in shape and also includes a ring of axially directed face teeth opposite the first clutch member face teeth and meshing with said face teeth in the first coupling member position.

10. The invention defined in claim 9 wherein the cam means includes a first annular cam surface integrally associated with the end of the coupling member adjacent the actuating member, and a second annular cam surface integrally associated with the end of the actuating member and engageable with the first cam surface.

References Cited
UNITED STATES PATENTS

| | | | |
|---|---|---|---|
| 784,285 | 3/1905 | Sturtevant | 192—54 |
| 1,989,404 | 1/1935 | Dickieson | 192—54 |
| 2,597,140 | 5/1952 | Versnel | 192—56 |
| 2,692,666 | 10/1954 | Thomson | 192—56 |
| 3,176,811 | 4/1965 | Smith | 192—54 |
| 3,252,553 | 5/1966 | Peterson | 192—54 |

BENJAMIN W. WYCHE III, *Primary Examiner.*

L. J. PAYNE, *Assistant Examiner.*